(12) United States Patent
Lin

(10) Patent No.: US 7,637,522 B2
(45) Date of Patent: Dec. 29, 2009

(54) BICYCLE FRAME

(75) Inventor: Chun-Hung Lin, Taichung (TW)

(73) Assignee: Ideal Bike Corp., Taichung County (TW)

( * ) Notice: Subject to any disclaimer, the term of this patent is extended or adjusted under 35 U.S.C. 154(b) by 129 days.

(21) Appl. No.: 12/071,415

(22) Filed: Feb. 21, 2008

(65) Prior Publication Data

US 2009/0212526 A1 Aug. 27, 2009

(51) Int. Cl.
B62K 19/00 (2006.01)
(52) U.S. Cl. .................................. 280/281.1; 280/287
(58) Field of Classification Search .............. 280/281.1, 280/278, 287
See application file for complete search history.

(56) References Cited

U.S. PATENT DOCUMENTS 3,362,725 A * 1/1968 Dolphin ...................... 280/287
3,512,816 A * 5/1970 Katano ........................ 403/102
3,854,755 A * 12/1974 Tang ........................... 280/278
4,067,589 A * 1/1978 Hon ............................ 280/278
4,132,428 A * 1/1979 Lassiere ...................... 280/278
4,448,435 A * 5/1984 Hon ............................ 280/278
4,911,458 A * 3/1990 Lin et al. ..................... 280/278
5,135,246 A * 8/1992 Montague ................... 280/231
5,398,955 A * 3/1995 Yeh ............................ 280/287

* cited by examiner

*Primary Examiner*—Kevin Hurley

(57) ABSTRACT

A bicycle frame includes a front part and a rear part. The front part includes head tube, a seat tube and a down tube connected between the head tube and the seat tube. A first connection portion is connected to the conjunction portion of the seat tube and the down tube. The rear part includes a second connection portion, a connection plate extending from a top end of the second connection portion, and two chain stays and two seat stays extending from the connection plate. The connection plate is fixed to the seat tube by at least one bolt, and the first and second connection portions are connected to each other by at least two bolts. The first connection portion includes a ridge which is engaged with the groove defined in the second connection portion.

7 Claims, 7 Drawing Sheets

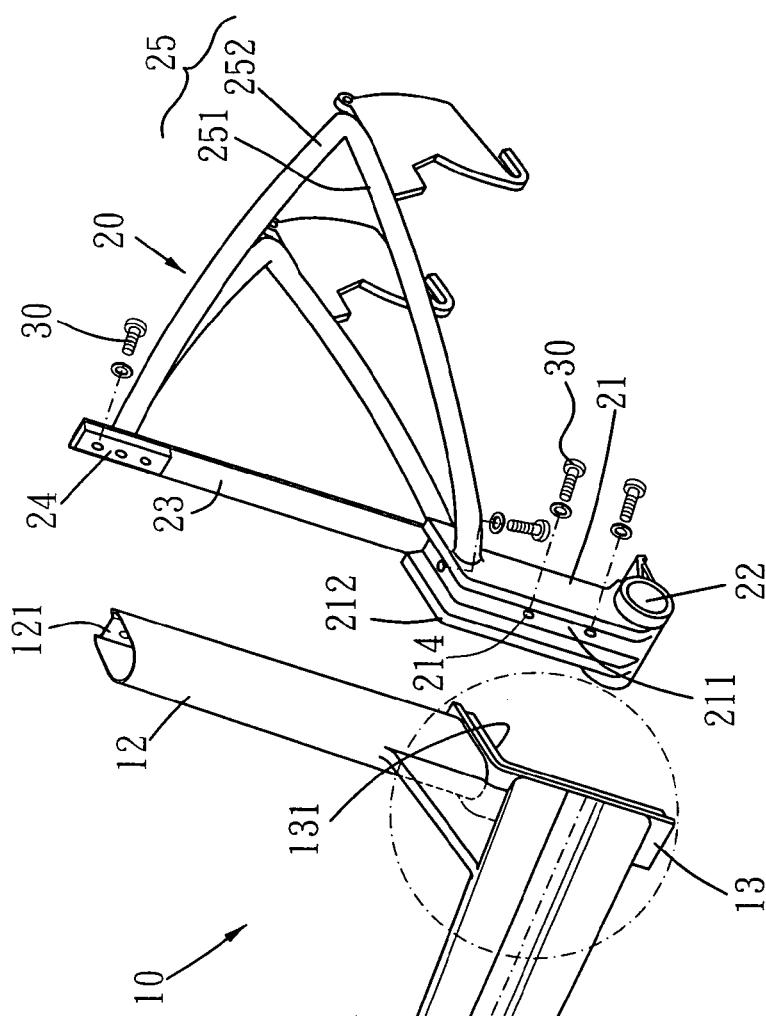
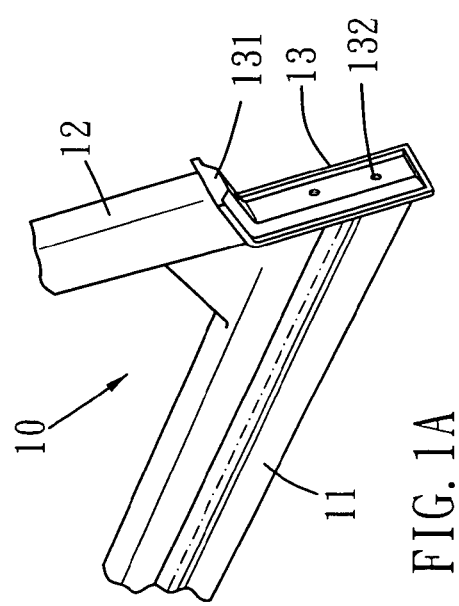
FIG. 1
FIG. 1A

BICYCLE FRAME

BACKGROUND OF THE INVENTION (1) Field of the Invention

The present invention relates to a bicycle frame composed of two parts which are connected to each other by matching two respective engaging portions.

(2) Description of the Prior Art

A conventional bicycle frame includes multiple tubes such as head tube, top tube, down tube, seat tube, seat stays and chain stays, these tubes are welded to each other to form a bicycle frame. The conventional bicycle frames requires a lot of tubes of different sizes and shapes in stock and this means a significant amount of money is required.

Some people simplify the bicycle frame to be a front part and a rear part, the front part includes two recesses defined in the seat tube and the rear part includes two connection members which are engaged with the recesses of the front part. However, the connection area between the front and rear parts is so limited and the bicycle frame is weak and unreliable. Once the bicycle frame is applied by an impact force, the bicycle frame could be broken into two parts. Besides, when connecting the connection members with the recesses, the front part might not be precisely connected to the rear part on the same plane, this results in a un-reliable frame.

The present invention intends to provide a bicycle frame composed of a front part and a rear part, the front part includes an L-shaped rail and the rear part includes an L-shaped groove with which the L-shaped rail is engaged, Bolts extend through the front and rear part to securely connect the rail in the groove. The connection area is sufficient and the rail is guided by the groove so that the alignment of the front part and the rear part is easily controlled.

SUMMARY OF THE INVENTION

The present invention relates to a bicycle frame and comprises a front part and a rear part. The front part includes a head tube, a down tube having one end connected to the head tube and a first connection portion connected to the other end of the down tube, and a seat tube having an end connected to the first connection portion. The rear part includes a second connection portion, a connection plate extending from a top end of the second connection portion, two chain stays extending from two sides of the top end of the second connection portion, and two seat stays having one end connected to the chain stays and the other end connected to the connection plate. The connection plate is fixed to the seat tube by at least one bolt. The first and second connection portions are connected to each other by at least two bolts.

The primary object of the present invention is to provide a bicycle frame which is composed of a first part and a second part, wherein the first connection portion of the front part can be precisely connected with second connection portion of the rear part.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1 is an exploded view to show the front part and the rear part of the bicycle frame of the present invention;

FIG. 1A is an enlarged view to show the circled portion in FIG. 1;

DETAILED DESCRIPTION OF THE PREFERRED EMBODIMENTS

Figure 2:
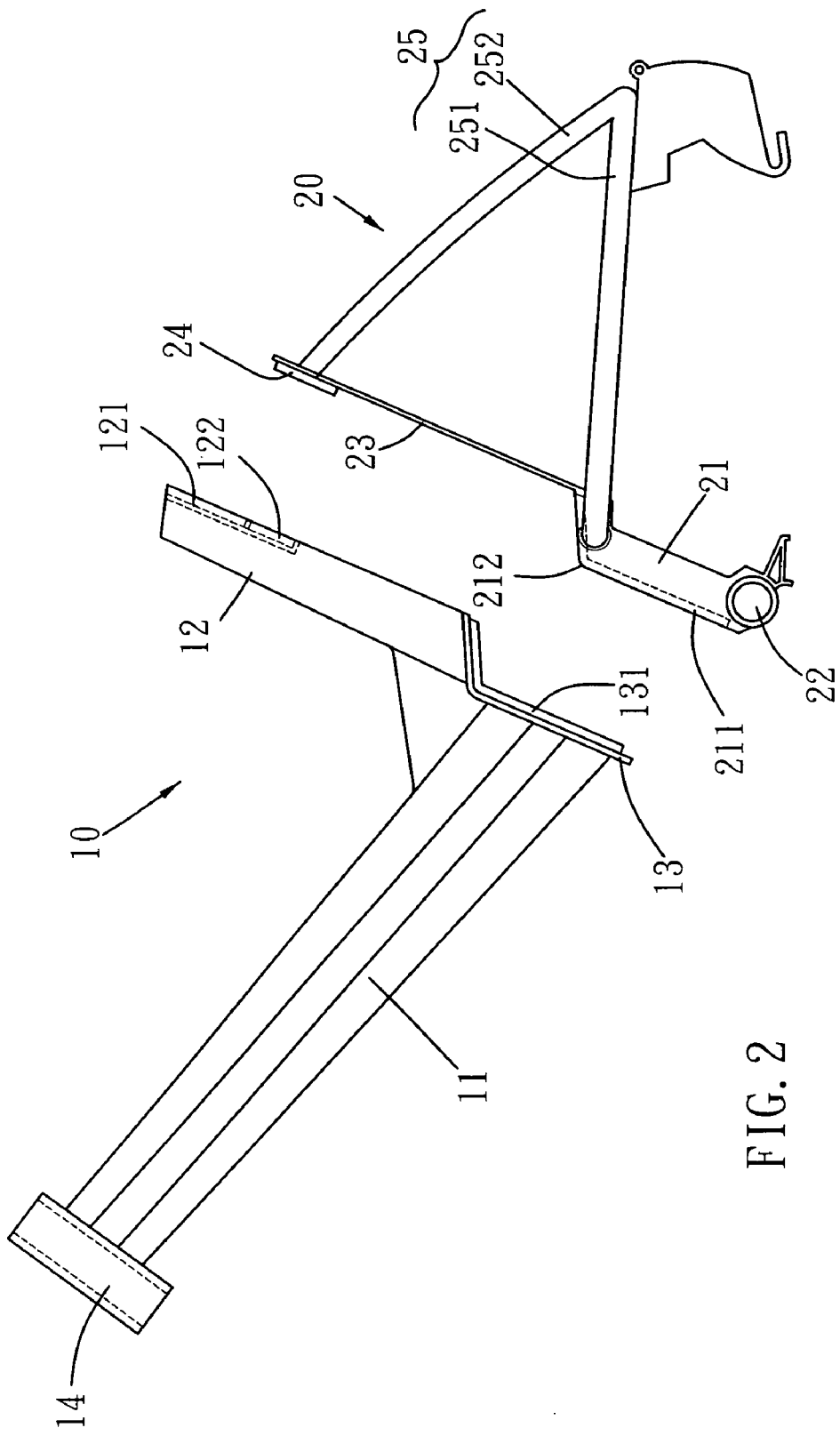
FIG. 2 is a side view to show the front and rear parts.
Figure 3:
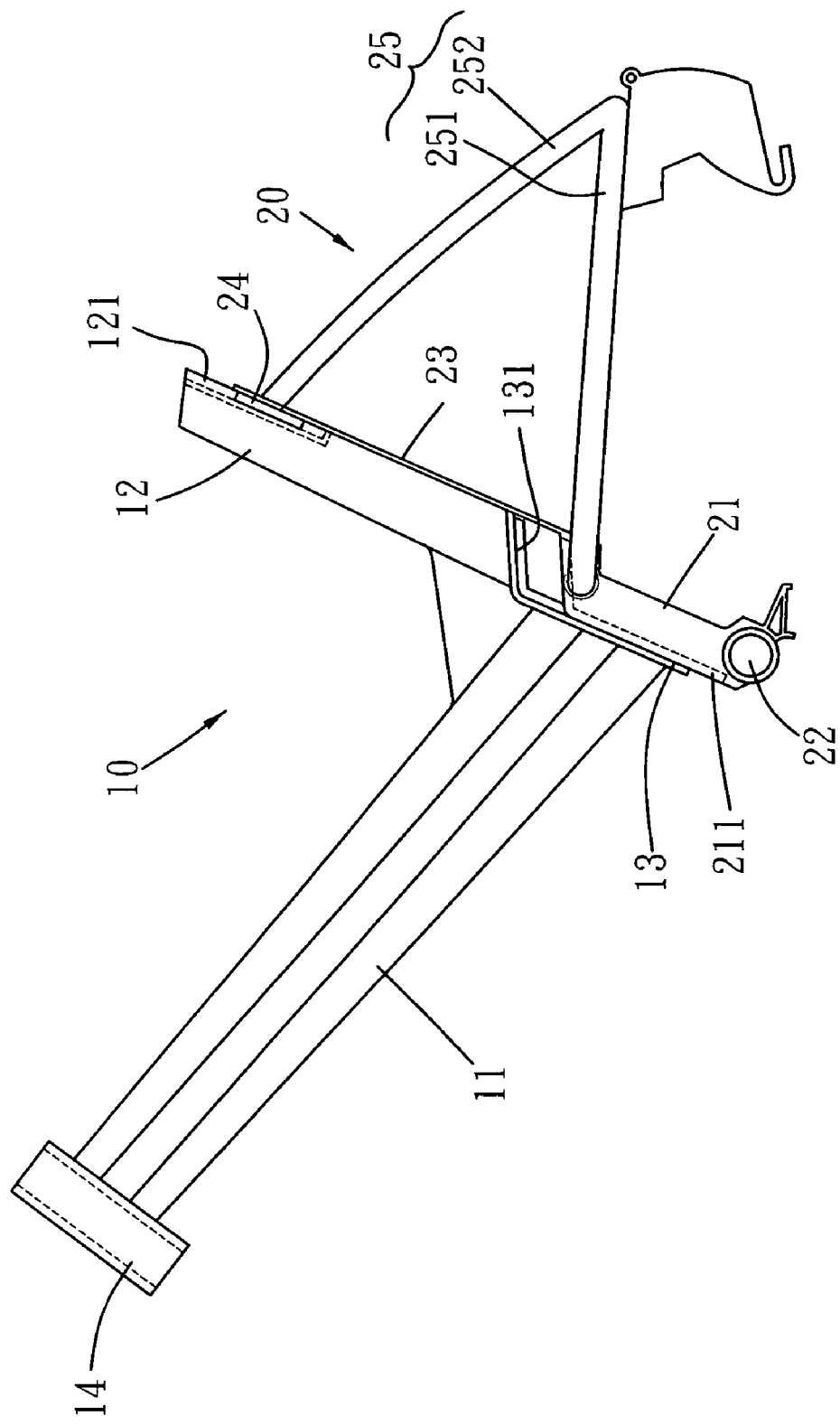
FIG. 3 is a side view to show that the rails on the connection part of the rear part are slidably engaged with the engaging grooves of the seat tube.
Figures 4, 4A:
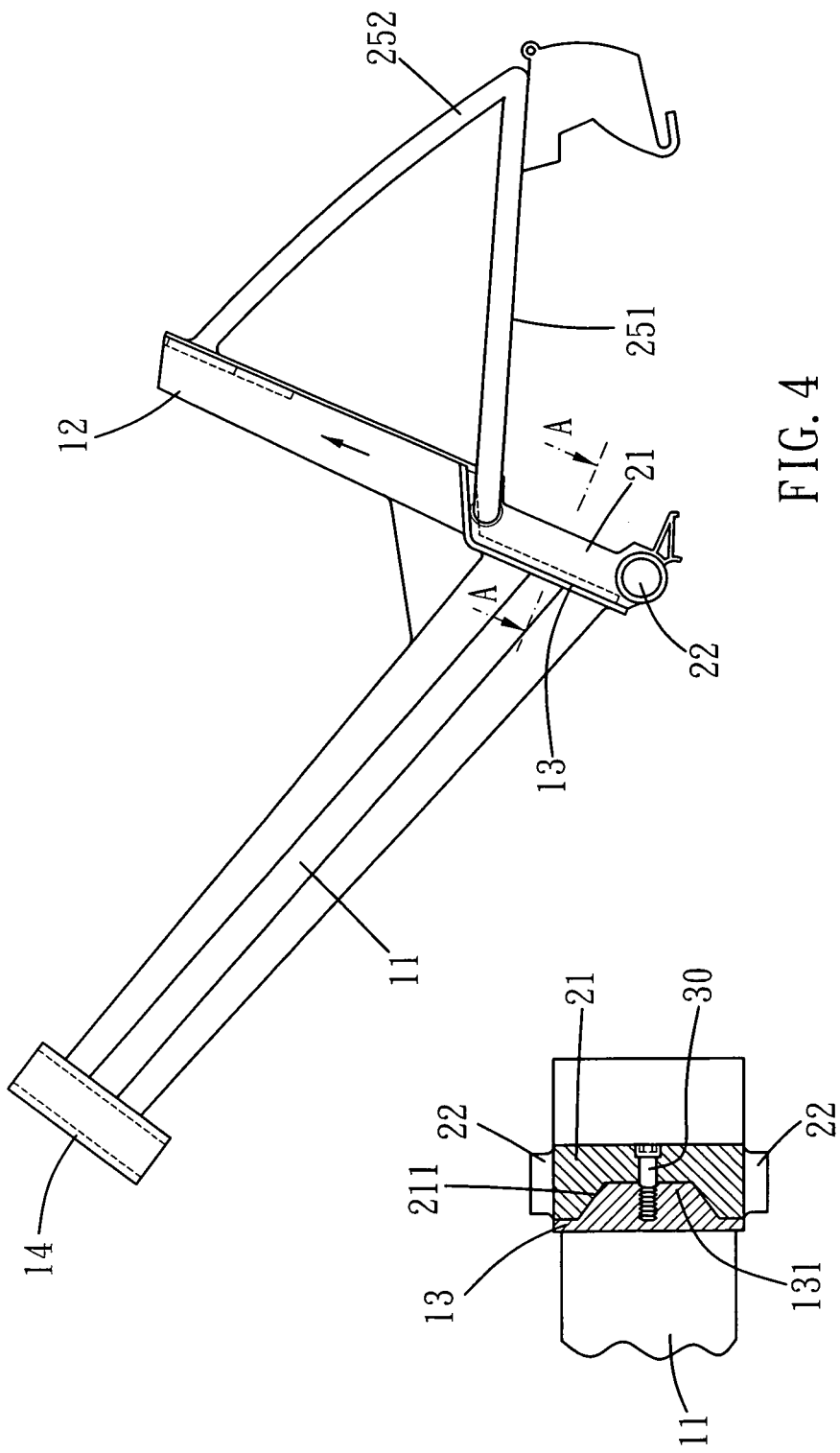
FIG. 4 shows that the front and rear parts are connected with each other.
FIG. 4A is a cross sectional view taken along line A-A in FIG. 4.
Figure 5:
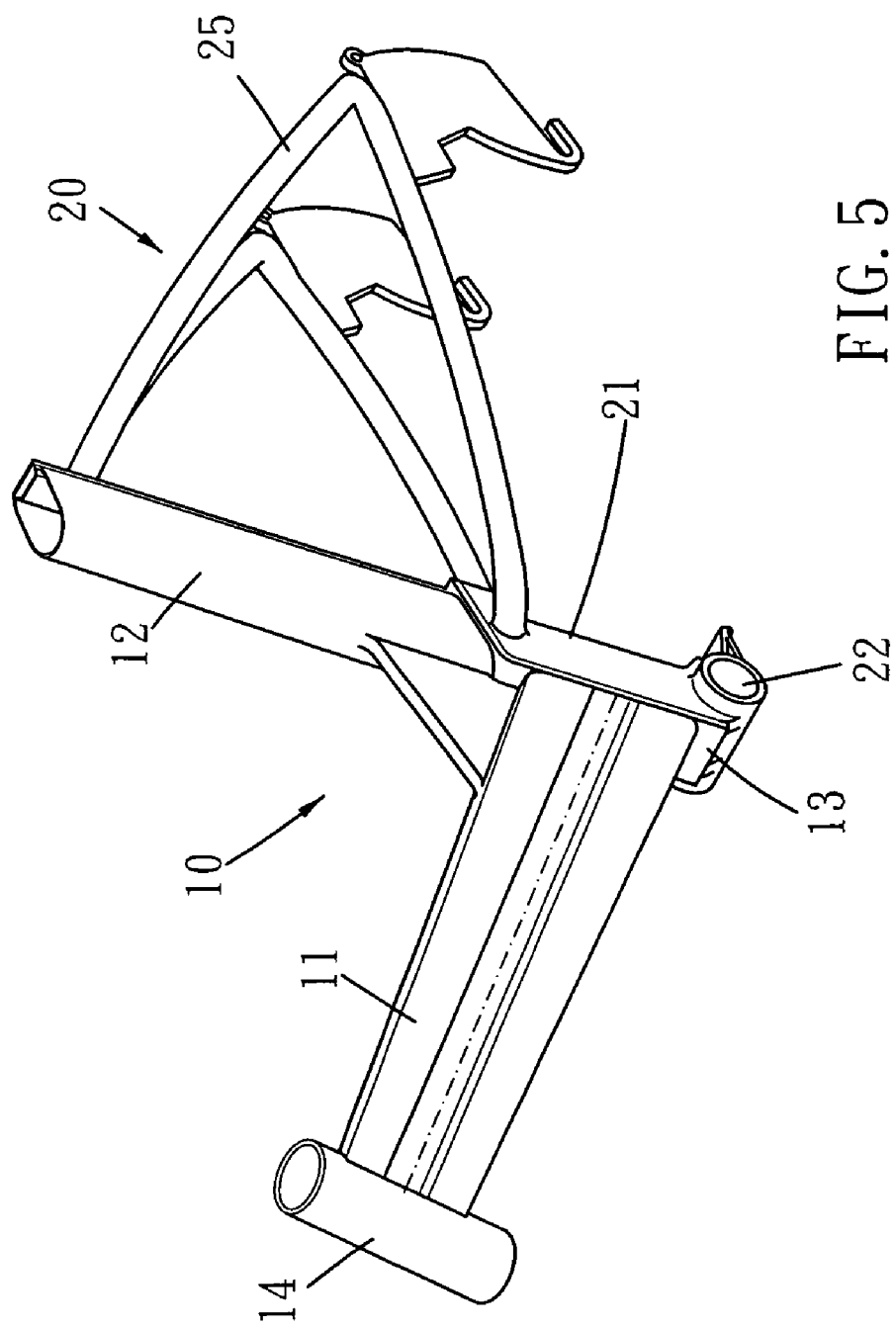
FIG. 5 is a perspective view to show the bicycle frame of the present invention.

Referring to FIGS. 1, 1A, 2, 3, 4, 4A and 5, the bicycle frame of the present invention comprises a front part 10 and a rear part 20. The front part 10 includes a head tube 14, a down tube 11 having one end connected to the head tube 14 and a first connection portion 13 connected to the other end of the down tube 11, and a seat tube 12 having an end connected to the first connection portion 13. The first connection portion 13 is an L-shaped board and a ridge 131 extends from a surface thereof. A plurality of threaded holes 132 are defined in the ridge 131.

The rear part 20 includes a second connection portion 21, a connection plate 23 extending from a top end of the second connection portion 21, two chain stays 251 extending from two sides of the top end of the second connection portion 21, two seat stays 252 having one end connected to the chain stays 251 and the other end connected to the connection plate 23. The connection of the chain stays 251 and the seat stays 252 forms a connection unit 25 to be connected with a rear wheel (not shown). The connection plate 23 includes a connection part 24 on its top end and two rails are formed on two sides of the connection part 24. The second connection portion 21 is an L-shaped member and includes a groove 211 which are defined between two parallel ribs 212. The second connection portion 21 has a bottom bracket 22 connected to a lower end thereof. A plurality of through holes 214 are defined through an inner surface of the groove 211.

The seat tube 12 includes a recessed area 121 defined in an outside thereof and two engaging grooves 122 are defined in the recessed area 121. The two rails on two sides of the connection part 24 are slidably engaged with the engaging grooves 122 when assembling the front part 10 and the rear part 20. The ridge 131 of the first connection portion 13 is engaged with the groove 211 of the second connection portion 21, bolts 30 extend through the through holes 214 and are connected to the threaded holes 132. At least one bolt 30 extends through the hole through the connection part 24 and is connected with the hole in the recessed area 121.

It is noted that the groove 211 guides the ridge 131 so that the front part 10 and the rear part 20 can be easily matched to each other precisely. Besides, the connection of the first and second connection portions 13, 21 are located at the lower end of the seat tube 12, the connection of the connection part 24 and the recessed area 121 is located at the top of the seat tube 12, so that the front and rear parts 10, are firmly connected to each other.

Figure 6:
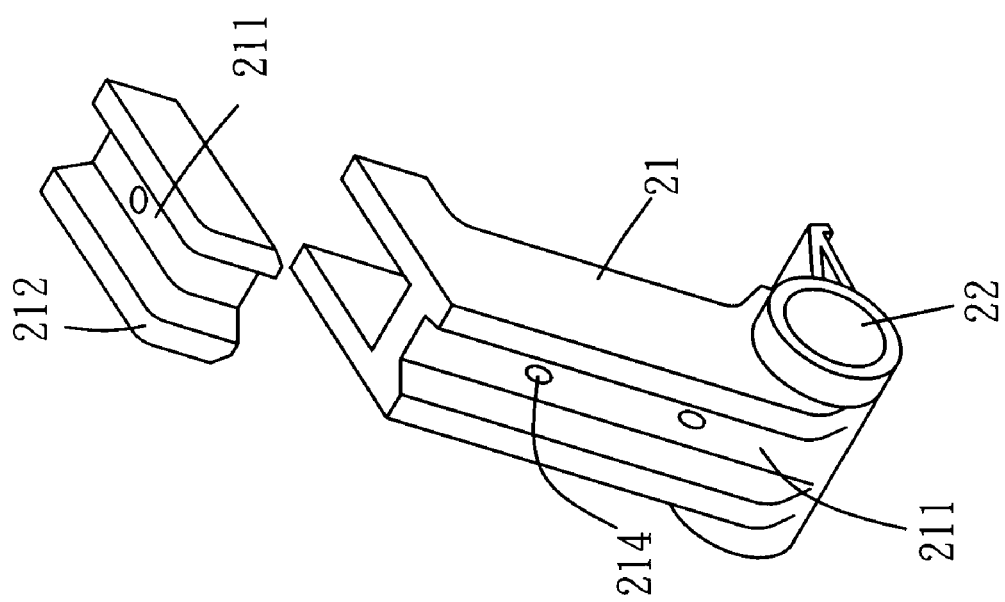
FIG. 6 shows that the second connection portion can be made into two pieces.

FIG. 6 shows that the second connection portion 21 can be made by way of extrusion or into two separated parts.

The derailleur system and the shifting system are connected to the rear part 20 in the manufacturing factory so that the when replacing a new front part 10, the derailleur system and the shifting system need not to be adjusted again. The front and rear parts 10, 20 can be freely matched to each other so that if the factory develops five different front parts 10 and three rear parts 20, the combination of the bicycle frames can be fifteen different models.

Figure 7:
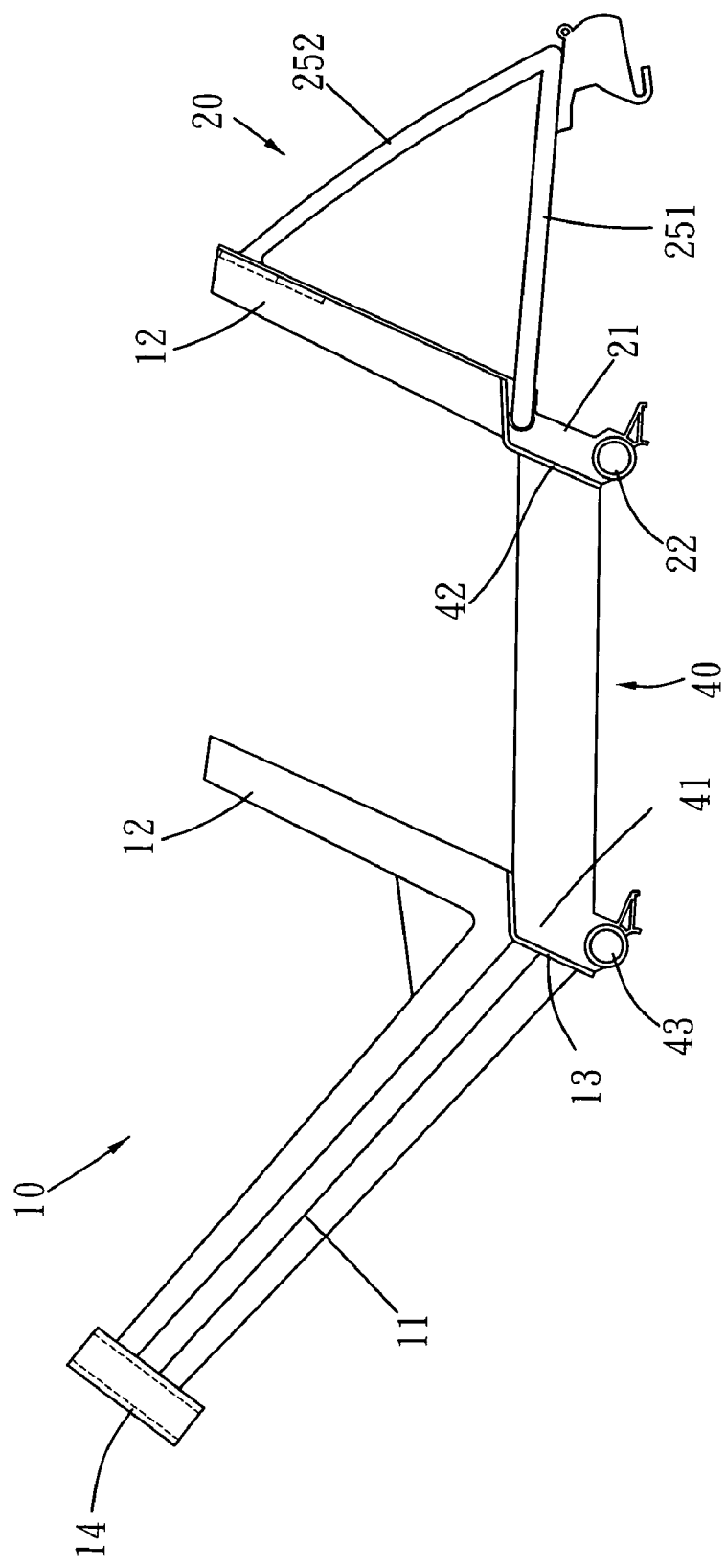
FIG. 7 shows that an extension part is connected between the front and rear parts.

FIG. 7 shows that an extension part 40 is connected between the first and second connection portions 13, 21, wherein the extension part 40 includes a third connection portion 42 the same as the first connection portion 13 so as to be connected with the second connection portion 21 of the rear part 20, and a fourth connection portion 41 which is the same as the second connection portion 21 so as to be connected with the first connection portion 13. Another bottom bracket 43 is connected to the fourth connection portion 41 of the extension part 40 so that two sets of cranks can be installed to the bicycle frame for two riders to operate the bicycle.

While we have shown and described the embodiment in accordance with the present invention, it should be clear to those skilled in the art that further embodiments may be made without departing from the scope of the present invention.

What is claimed is:

1. A bicycle frame comprising:
   a front part including a head tube, a down tube having one end connected to the head tube and a first connection portion connected to the other end of the down tube, a seat tube having an end connected to the first connection portion, and
   a rear part including a second connection portion, a connection plate extending from a top end of the second connection portion, two chain stays extending from two sides of the top end of the second connection portion, two seat stays having one end connected to the chain stays and the other end connected to the connection plate, the connection plate fixed to the seat tube by at least one bolt, the first and second connection portions being connected to each other by at least two bolts.

2. The bicycle frame as claimed in claim 1, wherein the first connection portion is an L-shaped board and a ridge extends from a surface thereof, the second connection portion is an L-shaped member and includes a groove with which the ridge is engaged by the at least two bolts.

3. The bicycle frame as claimed in claim 1, wherein the seat tube includes a recessed area defined in an outside thereof and two engaging grooves are defined in the recessed area, the connection plate includes a connection part which includes two rails on two sides thereof, the rails are slidably engaged with the engaging grooves.

4. The bicycle frame as claimed in claim 1, wherein the second connection portion has a bottom bracket connected to a lower end thereof.

5. The bicycle frame as claimed in claim 1, where the second connection portion has two parallel ribs and the groove is defined between the two parallel ribs.

6. The bicycle frame device as claimed in claim 2, wherein threaded holes are defined in the first connection portion and through holes are defined through an inner surface of the groove, the at least two bolts extend through the through holes and are connected to the threaded holes.

7. The bicycle frame device as claimed in claim 1, wherein an extension part is connected between the first and second connection portions, another bottom bracket is connected to the extension part and located close to the first connection portion.

\* \* \* \* \*